(12) United States Patent
Hanna (10) Patent No.: US 10,061,782 B2
(45) Date of Patent: Aug. 28, 2018

(54) METHOD AND APPARATUS FOR IMPROVING THE EFFICIENCY OF REMOTE DIAGNOSIS OF ELECTRONIC AND OTHER EQUIPMENT

(71) Applicant: Keith Hanna, Bronxville, NY (US)

(72) Inventor: Keith Hanna, Bronxville, NY (US)

( * ) Notice: Subject to any disclaimer, the term of this patent is extended or adjusted under 35 U.S.C. 154(b) by 42 days.

(21) Appl. No.: 15/356,164

(22) Filed: Nov. 18, 2016

(65) Prior Publication Data

US 2017/0150058 A1 May 25, 2017

Related U.S. Application Data

(60) Provisional application No. 62/257,231, filed on Nov. 19, 2015.

(51) Int. Cl.
| | |
|---|---|
| *H04N 5/228* | (2006.01) |
| *G06F 17/30* | (2006.01) |
| *H04N 1/00* | (2006.01) |
| *G06T 7/00* | (2017.01) |
| *H04N 5/76* | (2006.01) |
| *G06T 7/40* | (2017.01) |
| *H04N 101/00* | (2006.01) |
| *G06T 7/90* | (2017.01) |
| *G06T 7/38* | (2017.01) |

(52) U.S. Cl.
CPC .. *G06F 17/30256* (2013.01); *G06F 17/30017* (2013.01); *G06T 7/0038* (2013.01); *G06T 7/408* (2013.01); *H04N 1/00129* (2013.01); *H04N 1/00209* (2013.01); *H04N 5/76* (2013.01); *G06T 7/38* (2017.01); *G06T 7/90* (2017.01); *H04N 2101/00* (2013.01); *H04N 2201/0072* (2013.01); *H04N 2201/0084* (2013.01)

(58) Field of Classification Search
CPC ......... G06F 17/30256; G06F 17/30271; G06T 7/408; G06T 7/003; H04N 5/76; H04N 1/00129; H04N 1/00209; H04N 2201/0072; H04N 2101/00; H04N 2201/0084
USPC ............... 348/222.1, 333.01, 333.04, 333.07
See application file for complete search history.

(56) References Cited

U.S. PATENT DOCUMENTS

| | | | | |
|---|---|---|---|---|
| 9,164,660 | B2 * | 10/2015 | Jung | G06F 3/0482 |
| 2013/0343621 | A1 * | 12/2013 | Wilson | G06T 11/001 |
| | | | | 382/128 |

* cited by examiner

*Primary Examiner* — Yogesh Aggarwal
(74) *Attorney, Agent, or Firm* — Foley and Lardner LLP (57) ABSTRACT

This disclosure describes methods and systems for providing instructions automatically to a user that return the status of an electronic device to a preferred functioning state. In a training stage, imagery of electronic devices with known device states are acquired and stored in a database, along with instructions to return the state of each electronic device to a preferred functioning state. In a diagnostic stage, imagery of a first electronic device is acquired and compared to imagery of the electronic devices in different states in the database. A proximity measure between each of the electronic devices in different states in the database, and the first electronic device is computed. The most likely states of the first device are determined based on the proximity measure. The instructions to return the state of the electronic device to a preferred functioning state are then displayed to a user on a screen display module.

10 Claims, 13 Drawing Sheets

| Status | Indicator Characterization | | | | | | | | | Resolution |
|---|---|---|---|---|---|---|---|---|---|---|
| 0: Coaxial signal is not present | 50% | 100% | 0% | 66% | 0% | | | | | Plug in Coaxial Cable on 2nd Connector at Rear of Device |
| | 2 | 0 | 0 | 6 | 0 | | | | | |
| | G | R | - | G | - | | | | | |
| | i0 | i1 | i2 | i3 | i4 | | | | | |
| 1: Internet is not working | 50% | 75% | 0% | 66% | 0% | | | | | Plug in Ethernet Cable |
| | 2 | 0 | 0 | 6 | 0 | | | | | |
| | G | G | - | R | - | | | | | |
| | i0 | i1 | i2 | i3 | i4 | | | | | |
| 2: Telephone is not working | 50% | 75% | 0% | 66% | 0% | | | | | Plug in Telephone cable |
| | 2 | 0 | 0 | 6 | 0 | | | | | |
| | R | G | - | G | - | | | | | |
| | i0 | i1 | i2 | i3 | i4 | | | | | |

METHOD AND APPARATUS FOR IMPROVING THE EFFICIENCY OF REMOTE DIAGNOSIS OF ELECTRONIC AND OTHER EQUIPMENT

RELATED APPLICATIONS

This application claims priority to and the benefit of U.S. Provisional Patent Application No. 62/257,231, filed Nov. 19, 2015, the entire content of which is incorporated herein by reference for all purposes.

FIELD OF THE DISCLOSURE

The present application generally relates to the remote diagnosis and problem resolution of electronic or other devices or equipment, including but not limited to systems and methods for providing instructions automatically to the user that return the status of the device or equipment to a preferred functioning state.

BACKGROUND

Electronic and other devices are becoming increasingly functional, for example single devices can provide cable TV, internet and telephone services. However such functionality can come at the expense of complexity of installation and maintenance. If a device is not working to the customer's satisfaction, then the customer typically calls support personnel during which the support personnel ask the customer to describe the status of the device and then attempts to provide resolutions to the problem. However due to the complexity of many devices, describing the status is both time consuming and error-prone, resulting in expensive, time-consuming support sessions.

BRIEF SUMMARY

The present disclosure addresses the efficiency of remote diagnosis and problem resolution of electronic or other devices or equipment by customers or workers.

In some embodiments, the state or status of an electronic device is diagnosed and resolution steps presented to a user by acquiring, by a camera module connected to a processor, first imagery of a first electronic device, retrieving from a database previously-acquired imagery of a plurality of electronic devices and their corresponding electronic device status, determining by a processor a plurality of difference vectors between the first imagery of the first electronic device and each set of imagery in the database corresponding to the plurality of electronic devices, selecting by a processor one or more records in the database based on the plurality of difference vectors; and displaying, on a screen display module, a set of resolution instructions based on the electronic device statuses of the selected records.

In some embodiments, the determination of the plurality of difference vectors comprises determining the difference between the electronic display or device status illuminators or cable connections on the first electronic device and the electronic display or device status illuminators corresponding to each of the plurality of electronic devices in the database.

In some embodiments, determining the difference between the electronic display or device status illuminators or cable connections on the first electronic device and the electronic display or device status illuminators corresponding to each of the plurality of electronic devices in the database comprises the steps of: registering images acquired over a time period of the first electronic device to a common coordinate system using a processor; registering, for each set of imagery in the database, the previously-acquired images of an electronic device to a common coordinate system using a processor; and determining, using a processor, for each set of imagery in the database, a proximity measure between the registered images corresponding to the first electronic device and the registered previously-acquired images of electronic devices.

In some embodiments, the method of determining the proximity measure comprises; a determination, using a processor, of a distance metric between the colors of the device status illuminators on the first electronic device, and the colors of the device status illuminators of the electronic device in the database.

In some embodiments, the method of determining the proximity measure comprises; a determination, using a processor, of a distance metric between the temporal sequencing of the device status illuminators on the first electronic device, and the temporal sequencing of the device status illuminators of the electronic device in the database In some embodiments the method of determining the proximity measure comprises; a determination, using a processor, of a distance metric between the temporal sequencing of the device status illuminators on the first electronic device, and the temporal sequencing of the device status illuminators of the electronic device in the database In some embodiments the method of selecting one or more records in the database comprises; determining, using a processor, the minimum difference vector or minimum proximity measure.

The system for remote diagnosis and problem resolution hay have three primary system components; training, diagnosis and problem resolution components.

Training Component

Figure 1:
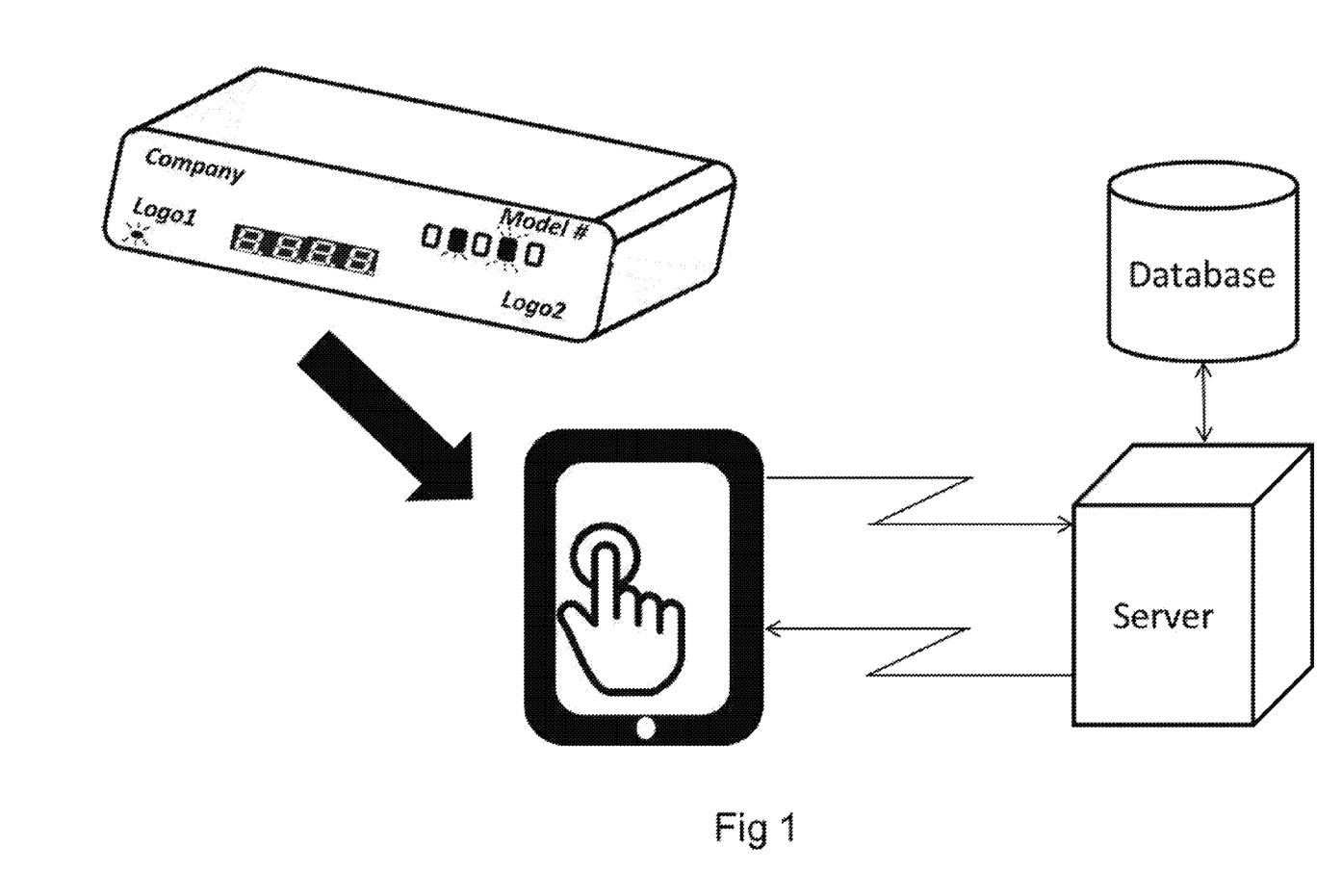
FIG. 1 shows in an example training mode one embodiment of an electronic device with an electronic display and device illuminators; a mobile device with a camera module, a screen display module, and an integrated processor; and a server with a processor connected to a database.

In the training component, a trainer may take a sample device and invoke all expected failure modes. For each failure mode, the trainer uses the training system to acquire at least imagery, including video, and potentially audio. FIG. 1 shows an example implementation. The sample device is at the top left and the trainer acquires video using an app on a mobile phone shown in the middle of the image. The mobile phone communicates wirelessly with a server connected to a database that stores the result of the training.

After images are acquired, key areas in at least one of the acquired images are then identified either automatically or manually by the trainer. There may be three types of key areas; device identification areas, registration areas and status indicator areas. Device identification areas may be regions that identify the unique model number of the device. Such regions may include imagery of a bar code for example. The trainer may also manually enter the device identification using a GUI on the mobile phone. Registration areas may be fixed patterns of texture on the device that will be present on all devices, including those that will be used in the diagnostic stage performed by customers. Examples of registration areas may be the print of device logos or manufacturer's name on the device. Registration areas may also be the boundaries of the edges of status indicator LEDs. Status indicator areas may be regions on the device that produce outputs that collectively may indicate the current operating mode of the device. For example, a status indicator area may include a multi-colored indicator LED, an alphanumeric LED display, or an LCD screen. It is possible for a status indicator area to also be a registration area. For example, a power light may always be on and may be used as a registration area.

Once key areas have been identified, the trainer may invoke each known failure mode. For each failure mode, the training system may learn the characteristics of the status indicators. For example, the system may learn that when a cable is unplugged, then status indicator region 2 is colored RED. For each mode of operation (failure mode or semi-functioning mode) the trainer may document a resolution step, for example by recording a video of the resolution (for example plugging in a cable at the correct location), or by documenting the resolution either graphically or by a text descriptions. In some embodiments, the resolution step may be designed only to transition the device from a full-failure mode to a semi-failure mode in order to decouple resolution steps and avoid the customer having to perform 2-3 resolution processes simultaneously.

The failure modes may then be stored in a database along with the learned characteristics of the device indicators, as well as the graphical, text or other descriptions of the resolution steps.

Diagnostic Component

Figure 2:
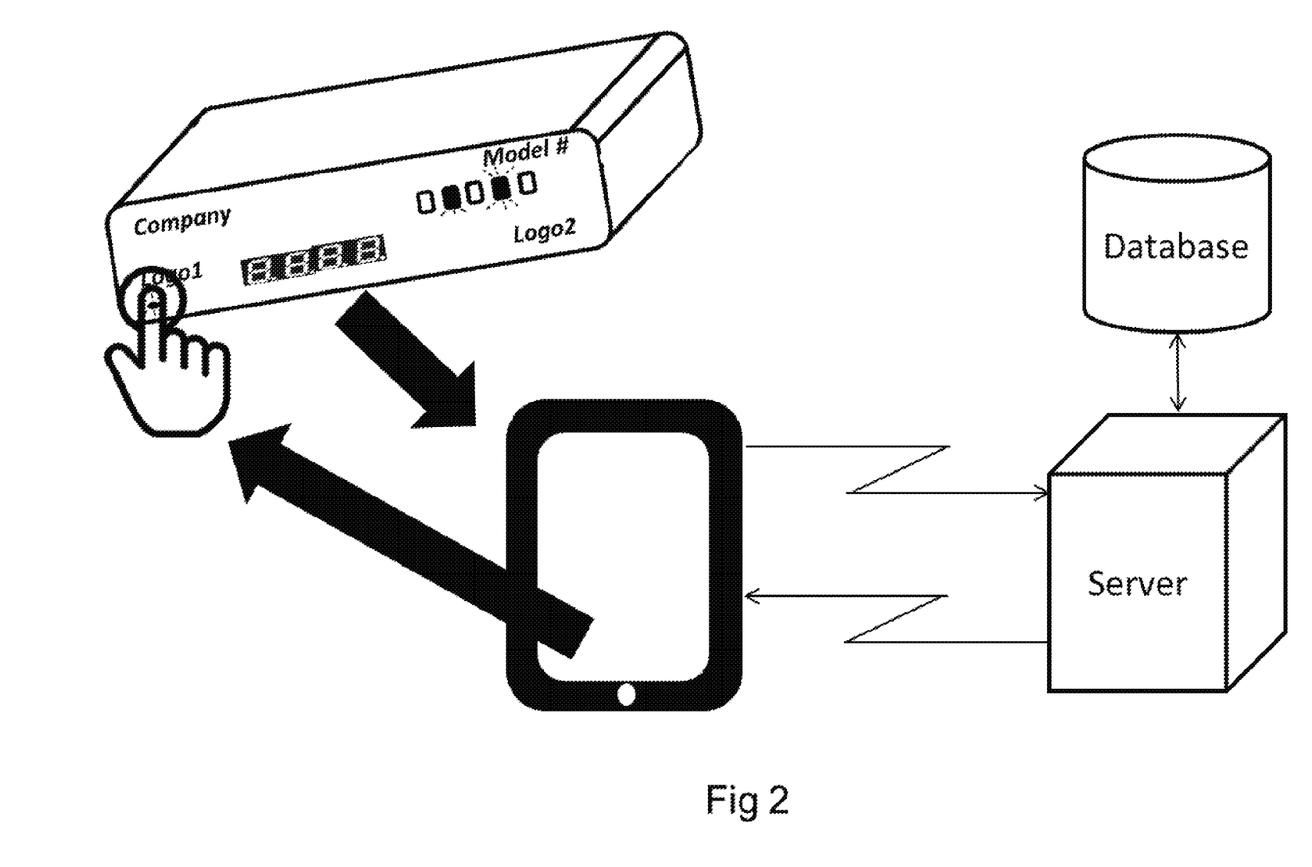
FIG. 2 shows one embodiment of the system of FIG. 1 being used in a diagnostic mode.

The second step in the system may be diagnosis. It is expected that an unskilled customer may use the diagnosis component. The customer may use the diagnostic system to acquire at least imagery, including video, of their device when it is in a failure mode that may require resolution. FIG. 2 shows an example implementation. The customer's device is at the top left and the customer acquires video from a mobile phone as shown in the center of the figure. The mobile phone communicates wirelessly with a server connected to the training database.

The diagnostic system component or the customer may identify the ID of the device, and the diagnostic system may automatically identify the indicator region areas, measure the characteristics of the indicator lights, compare it to the characteristics acquired during the training process, and determine the operating mode of the device, as will be described in more detail later.

Problem Resolution Component

The device ID and device status may then be sent to a server which may then retrieve a resolution step from the database. The resolution step may then be presented to the user on the mobile phone, after which the customer may attempt to resolve the problem by following the resolution step instructions to return the device to a preferred functioning state. A preferred functioning state may be defined as a state whereby internet connectivity is restored, or phone connectivity is restored, for example.

BRIEF SUMMARY OF FIGURES

The foregoing and other objects, aspects, features, and advantages of the present solution will become more apparent and better understood by referring to the following description taken in conjunction with the accompanying drawings, in which.

DETAILED DESCRIPTION OF THE SPECIFICATION

Training Component

Figure 3:
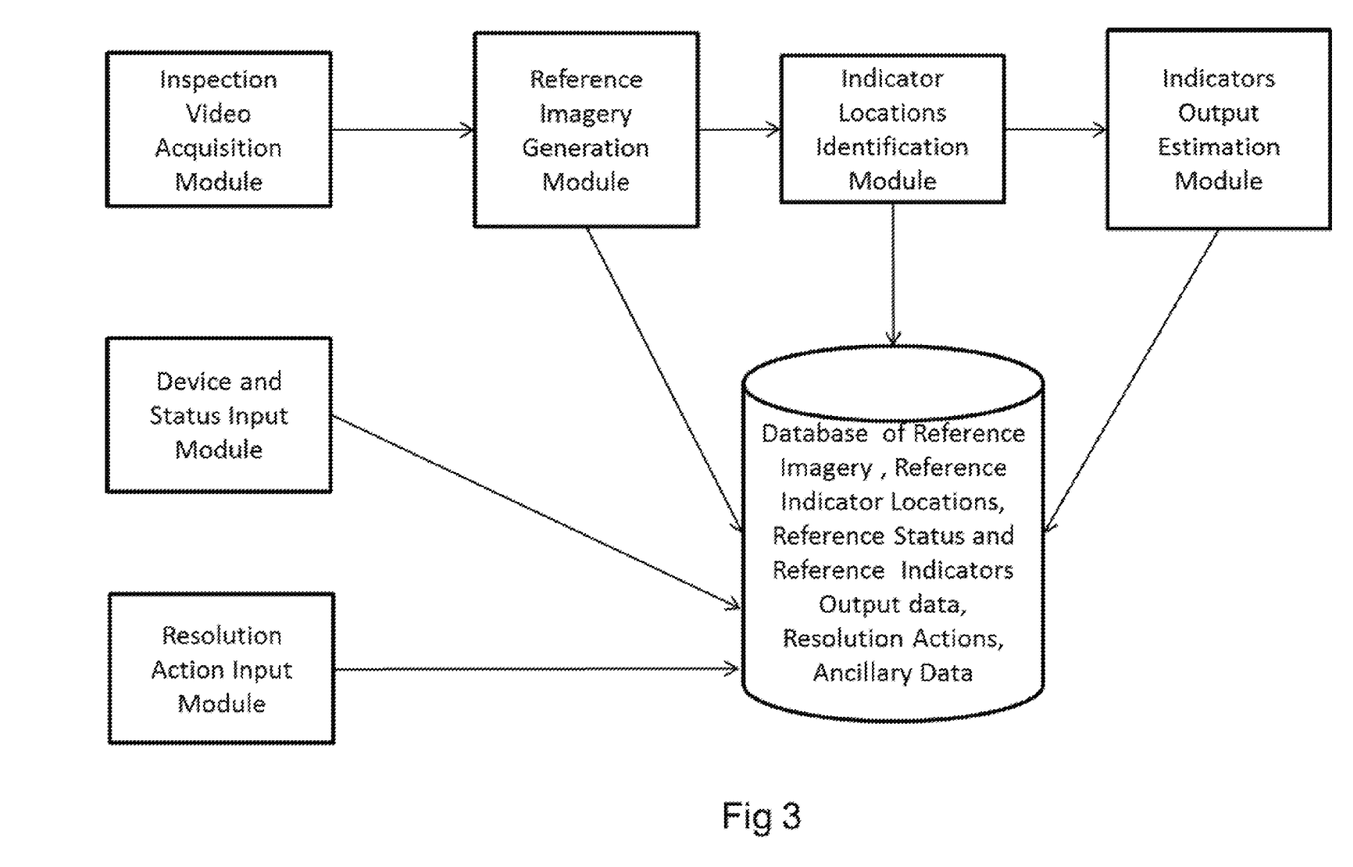
FIG. 3 shows a block diagram of one embodiment of a training method whereby data attributes corresponding to a plurality of electronic devices each in a certain electronic device status state is stored in the database, including a set of resolution instructions that a user can execute to return the device to a preferred functioning state.
Figure 4:
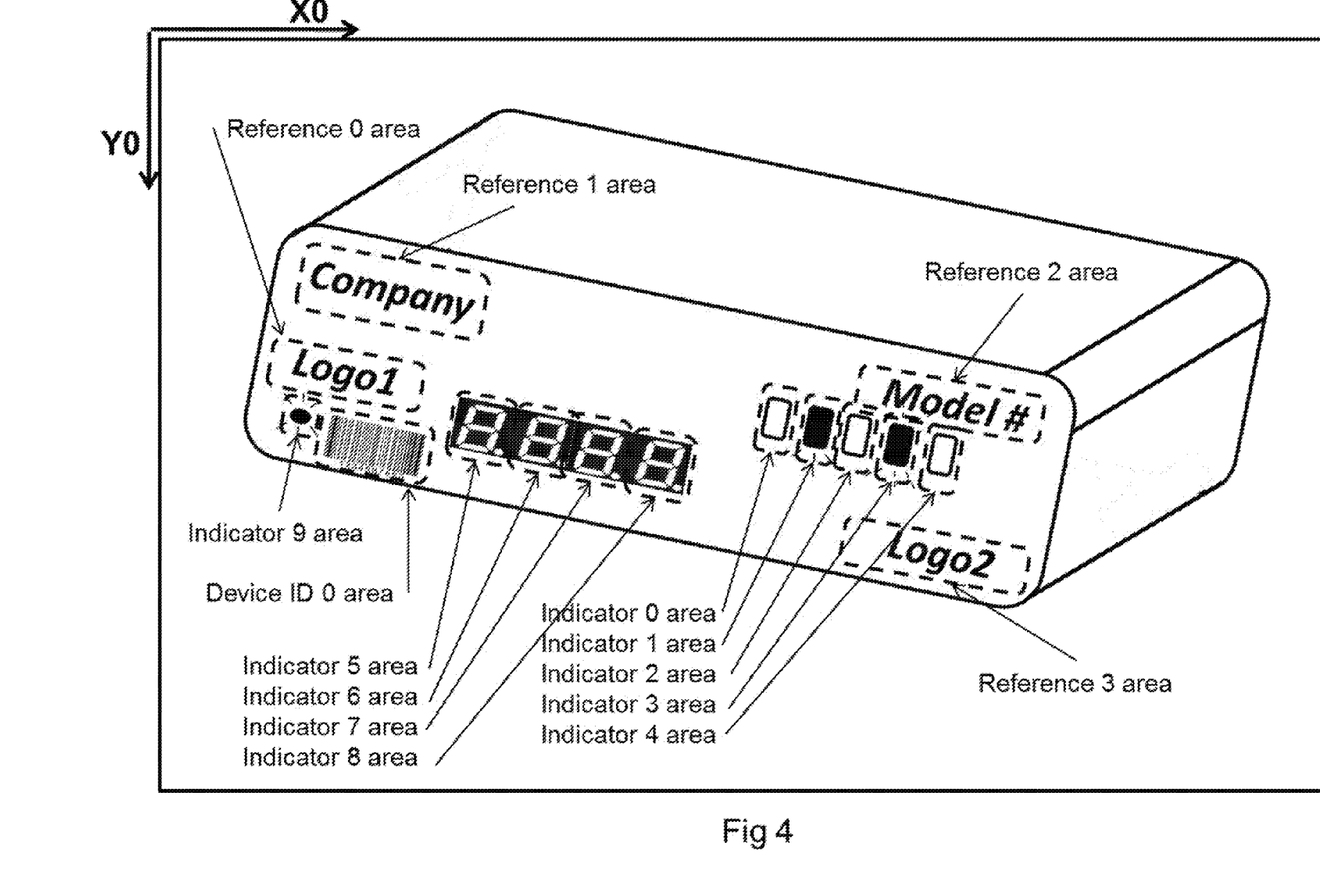
FIG. 4 shows a coordinate system of illustrative imagery acquired by one embodiment of the camera module, and details of features on one embodiment of the electronic device including an electronic display and device status illuminators FIG. 5 on the left shows an example temporal series of unregistered images acquired by the camera module, and on the right shows the same images registered to a common coordinate system using a processor.

FIG. 3 shows a block diagram of one embodiment of the training component. A video acquisition module may acquire observed inspection imagery, including video and potentially audio, of the sample device when in a particular failure mode. A reference imagery generation module may identify one or more reference images in the acquired video or imagery. This may be performed by the trainer selecting manually an image from the acquired sequence, or may be from an electronic CAD drawing of the device, for example. FIG. 4 shows such a reference image. The trainer may identify using a GUI on the phone suitable registration areas and device indication areas, and any potential device ID regions in the reference imagery. The manual selection may be performed using a polygon draw-tool, for example, that defines a closed-area region, as shown in the regions labeled in FIG. 4. Along with each region the worker enters a label for the region. For example, if there are 10 indicator LEDs then there may be 10 separate regions and 10 separate labels as shown in FIG. 4.

An example of a device ID region in an image region may include a bar-code as shown in FIG. 4. A bar-code reading algorithm (for example U.S. Pat. No. 4,308,455) may provide a coded number, which may be used to index into a library of model numbers, in order to pick out the model number of the device. Alternatively, the worker may enter in the model number of the device manually using the GUI.

The registration areas may be selected so that their positions may not change with respect to the indicators across multiple devices with the same model type. Such regions may be the embossed logos or edges and corners of buttons of displays, for example. Temporary stickers on the other hand may not be good registration areas since they may appear in different positions in different devices.

Figure 5:
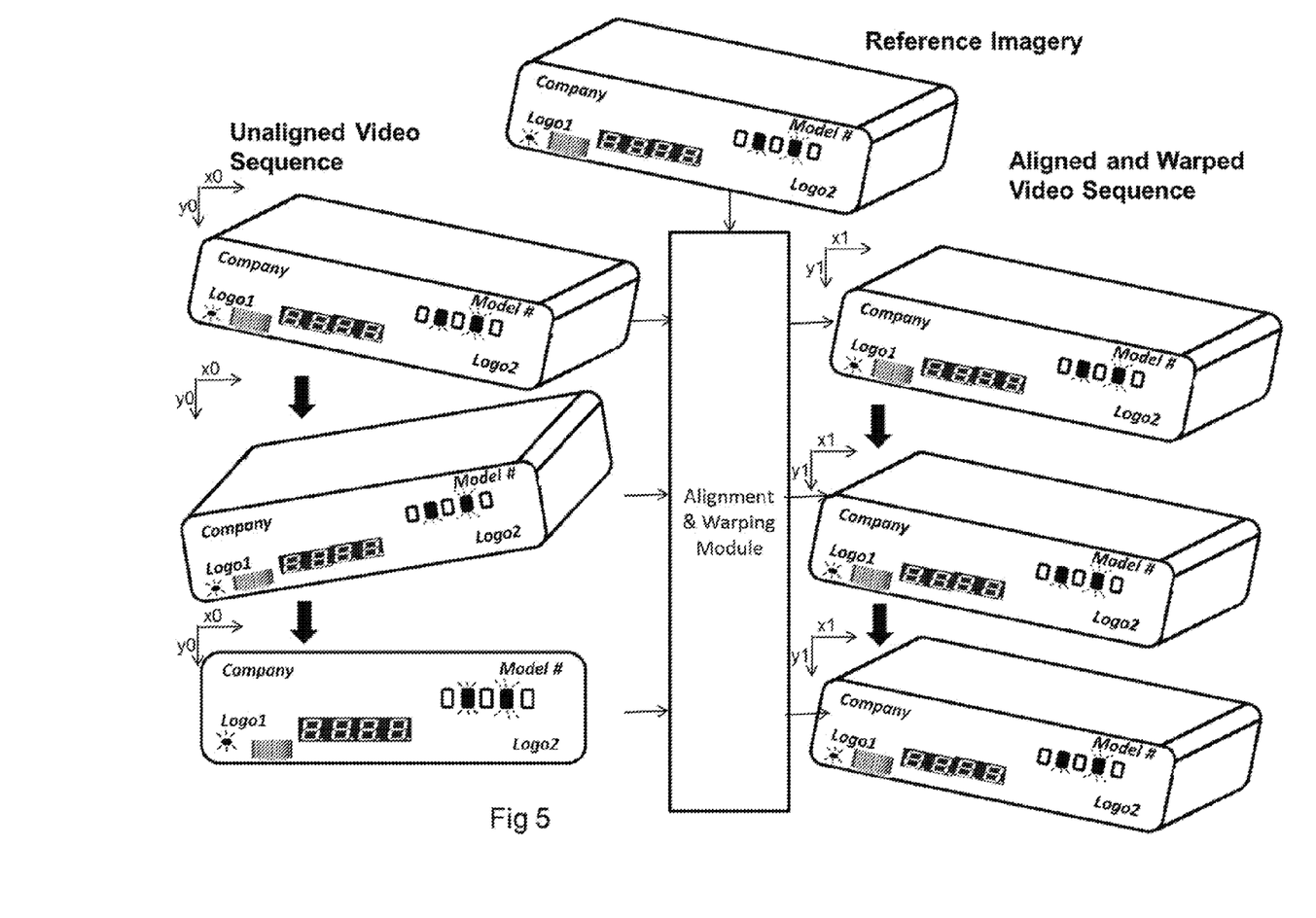

The registration areas, status indicator areas, reference imagery and acquired video is then passed to the Indicator Locations Identification module as shown in FIG. 3. This module may take the video imagery and may align each frame to the reference imagery using the registration areas as features. This registration step may be performed in order to enable the extraction of temporal or sequential information (such as a flashing LED, as opposed to an always-on LED). FIG. 5 on the left shows examples of imagery that may appear in the acquired video sequence.

Note that the device and the precise locations of the illumination status devices are not in the same positions in each acquired image with respect to the camera coordinate system X0,Y0 of the video acquisition device due to, for example, movement of the hand-held camera with respect to the device.

Many indicator lights are mounted on a planar or semi-planar 3D surface. This can simplify the registration and allow a planar model-based image-based alignment method to be used. Correlation or gradient-based approaches are example methods for performing alignment. An example of such alignment methods are disclosed in "A survey of Registration Techniques", Lisa Brown, ACM computing surveys (CSUR) 24(4), 325-376, ACM, 1992. The alignment process, shown in FIG. 6, recovers alignment parameters between the reference image and each acquired image in the sequence. These alignment parameters may then used to warp the entire image, resulting in warped imagery where both the registration areas and the indicator status areas are aligned and in the same coordinate system X1,Y1 as shown to the right of FIG. 5.

In some embodiments, the registration process may be performed without use of a reference set of images, and only by using the acquired imagery itself. In one embodiment this is accomplished by detecting one or more features in the imagery that can be used to define an internal coordinate system for the image. In one embodiment of this, a power light on the left of the device and a second light on the right of the device may always be red. These features may be detected by taking the ratio of the red pixel intensity to the green pixel intensity at each point, thresholding, and by counting the number of pixels within a radius that are above the threshold. Those points that have counts above a second threshold may be determined to be derived from one of the two red lights. The coordinates of these points in the image may be determined by computing the centroid of the positions of the detected points within the radius. These 2 coordinate positions are sufficient to provide a translation, rotation and zoom transformation between the acquired image and 2 coordinate positions that were extracted from a reference image, either manually or automatically. This can be performed using a least-squares error computation to recover the model parameters between the 2 coordinate positions in the acquired image and 2 coordinate positions that were extracted from a reference image previously. For small rotations the model may be:

$$X2=(X1 \times K)+(Y1 \times K \times \text{alpha})+Tx$$

$$Y2=(-X1 \times K \times \text{alpha})+(Y1 \times K)+Ty$$

where the model parameters are K,alpha, Tx,Ty where K represents the zoom (1 represents no zoom change), alpha represents the relative rotation, and Tx,Ty represents the relative image shift.

Even simpler transformations—for example one dimensional with only Tx may be used.

In other embodiments of alignment, a reference template image overlay of the device and the registration areas may be shown on a GUI screen, and imagery acquired by the customer may be overlaid under or over the reference template. The customer may then move the image acquisition device back and forth or in and out until the features of the reference template appears aligned with the features of the device. This may be achieved by having some or all of the overlay display being transparent, or semi-transparent. This allows at least some imagery acquired by the customer to be visible on the screen while at the same time graphics or imagery from the reference imagery or template is shown at the same time. This is as opposed to having an opaque image of the reference template of graphic on the screen.

Figure 6:
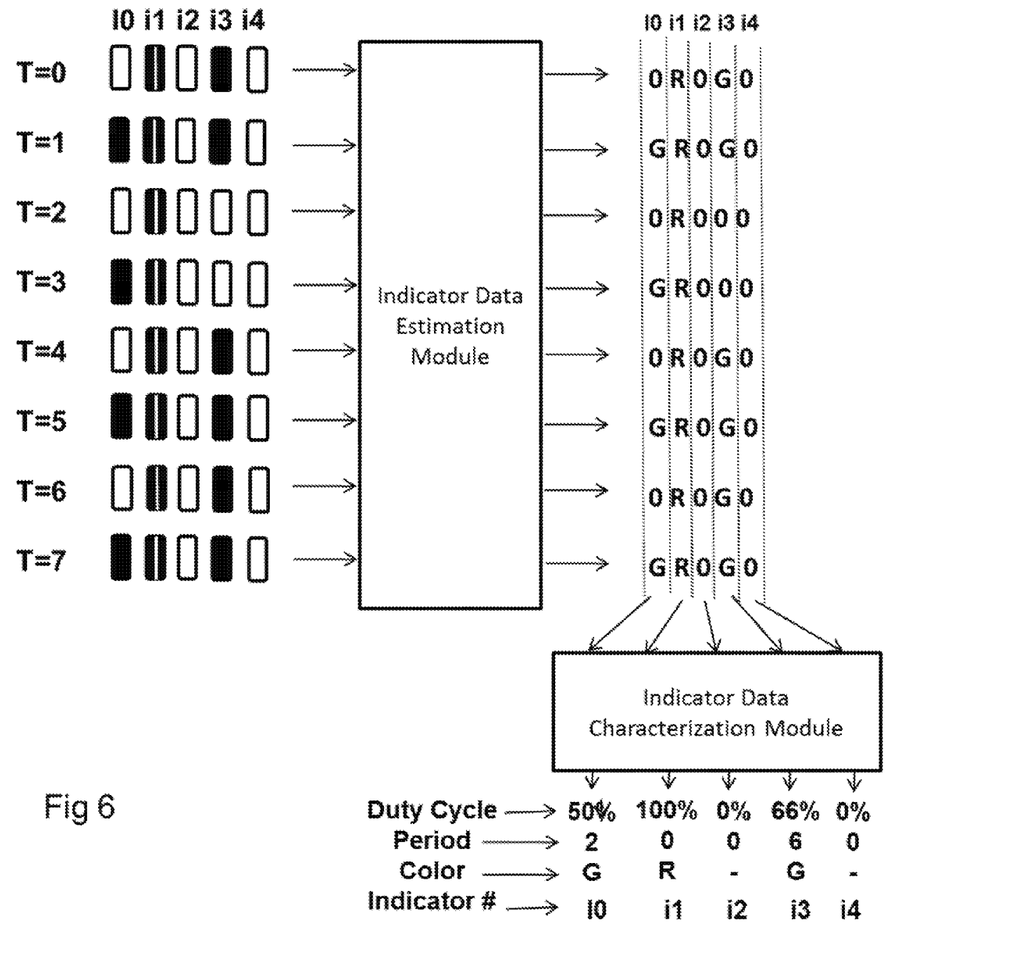
FIG. 6 on the left shows in an example training mode a temporal sequencing of device status illuminators over time, and on the bottom right shows an example determination of the electronic device status of the electronic device.

The next step may be the indicator output estimation module illustratively shown in FIG. 3, and in more detail illustrated in FIG. 6. In this step the aligned illumination areas may be measured and characterized. There are different types of indicators. For example, a status indicator area may include a multi-colored status LED, an alphanumeric LED display, or an LCD screen. These indicators may have a binary status (on/off), color status (red, green, blue) and temporal status. The temporal status may be characterized by a duty cycle (mark to space ratio) which reflects the percentage of time that the device is on compared to off, and also the period, which reflects the frequency at which a pulsing pattern repeats. Other sequencing characterizations are possible in other embodiments.

Figure 7:
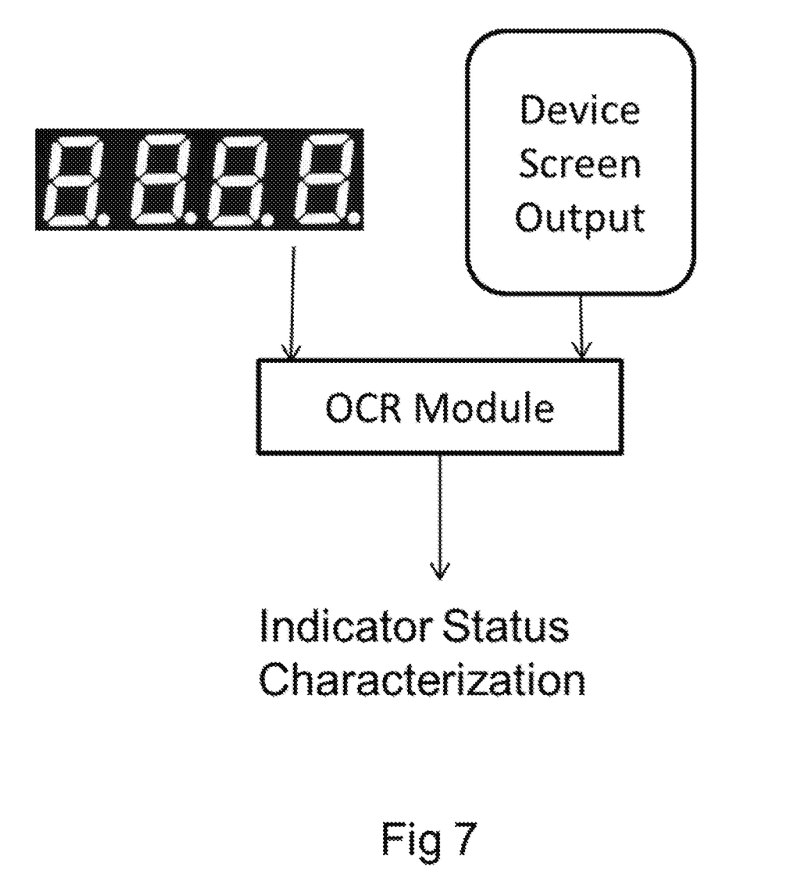
FIG. 7 shows one embodiment of a method for determining the status of the electronic device using an OCR module and the electronic display of the electronic device.

The indicator output estimation module, illustratively shown in the middle of FIG. 7, may take each aligned indicator region and may extract a numerical value for the indicator, which may be binary, reflecting whether the LED is on or off, for example. This may be performed in some embodiments by detecting the brightness of the pixels in each indicator region, optionally with respect to each other or another region on the device (such as the reference areas) that are unchanged during status indicator changes in order to normalize for the effects of differences in ambient illumination over time. An example normalization algorithm is to detect the difference between the average intensity in the indicator region and the average intensity in an adjacent aligned reference region. If the difference exceeds a threshold, then the LED is deemed to be turned on. If the difference is below a threshold, then the LED is deemed to be turned off.

In the case of a color indication LED, then in some embodiments each of the R,G,B color responses may be measured and the threshold process repeated for each color. In some embodiments, the trainer may manually adjust the threshold until the detected status of a particular indicator light matches the actual status. The result in this case may be a feature-extracted result of each indicator status in each aligned frame, as illustratively shown to the right of FIG. 7.

These feature-extracted results may then be passed to one embodiment of an Indicator Characterization Module illustratively shown at the bottom right of FIG. 7. This may analyze the extracted features over a time sequence for each indicator. The duty cycle may be computed as the ratio of on time to off time for an indicator. For example, if there are 100 frames acquired and in 65 of them the indicator is green and in 35 the indicator is off, then the duty cycle is computed to be 65%. In some embodiments and for a simple pulsing indicator, the period of the pulsing may be computed as the time between off/on transitions of a status indicator. For example, the off/on transition may be detected on frames 6, 12, 19, 25 of a sequence. The period calculated for each transition is then (12−6)=6, (19−12)=7, and (25−19)=6 respectively. This results in an average period of 6.33 frames. The image acquisition rate may also be stored in the database so that the frame rate of other acquisition devices using during diagnosis can be normalized to this value. The result may be a characterization of the indicator status lights for a particular device mode. This result may be stored in the database shown in FIG. 3, in one or more embodiments.

Note that there may be some variability in the status characterization due to several factors. These factors may include variability in specifications of components in the device, or sampling of the image just before or after a transition, as well as variability in the actual versus reported image acquisition frame rate. The operator can select a tolerance using the GUI which indicates the expected variations that are tolerated for each indicator. This may be used by the diagnostic system as described later.

In another example of a status characterization module, an Optical Character Recognition (OCR) module on the diagnostic device (for example the customer's mobile device) may read the text displayed on the device being diagnosed. An example of such an OCR method is provided in U.S. Pat. No. 4,876,735.

In another example, machine-learning algorithms can be trained on the acquired training imagery. An example of a machine learning algorithm is described in "ImageNet classification with deep convolutional neural networks", Proceedings of Advances in Neural Information Processing Systems, 2012, by Krizhevsky, Sutskever, Hinton.

Once the status has been characterized by the system, the trainer may then use the GUI to enter in the resolution step required to move from the current device mode to another (usually functioning or semi-functioning) mode. The resolution step may be stored as an image annotated by the worker as illustratively shown in FIG. 4, or may be textual information as shown in the right hand column of FIG. 8. The data may then be stored in the database as shown in FIG. 3.

The system may then be ready to be used in the diagnostic and problem resolution mode.

Diagnostic Component

Figure 10:
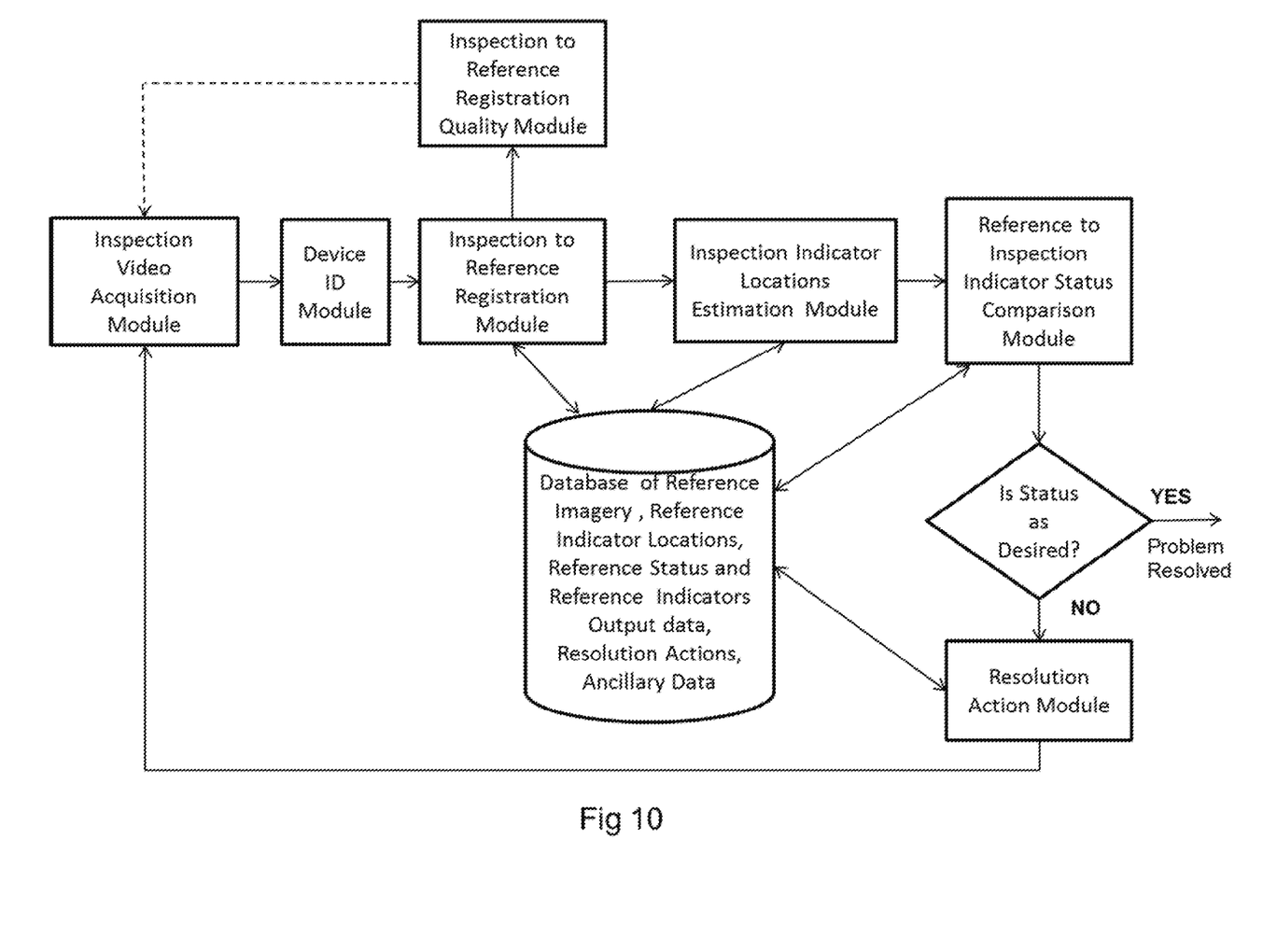
FIG. 10 shows a block diagram of one embodiment of the diagnostic system.
Figure 11:
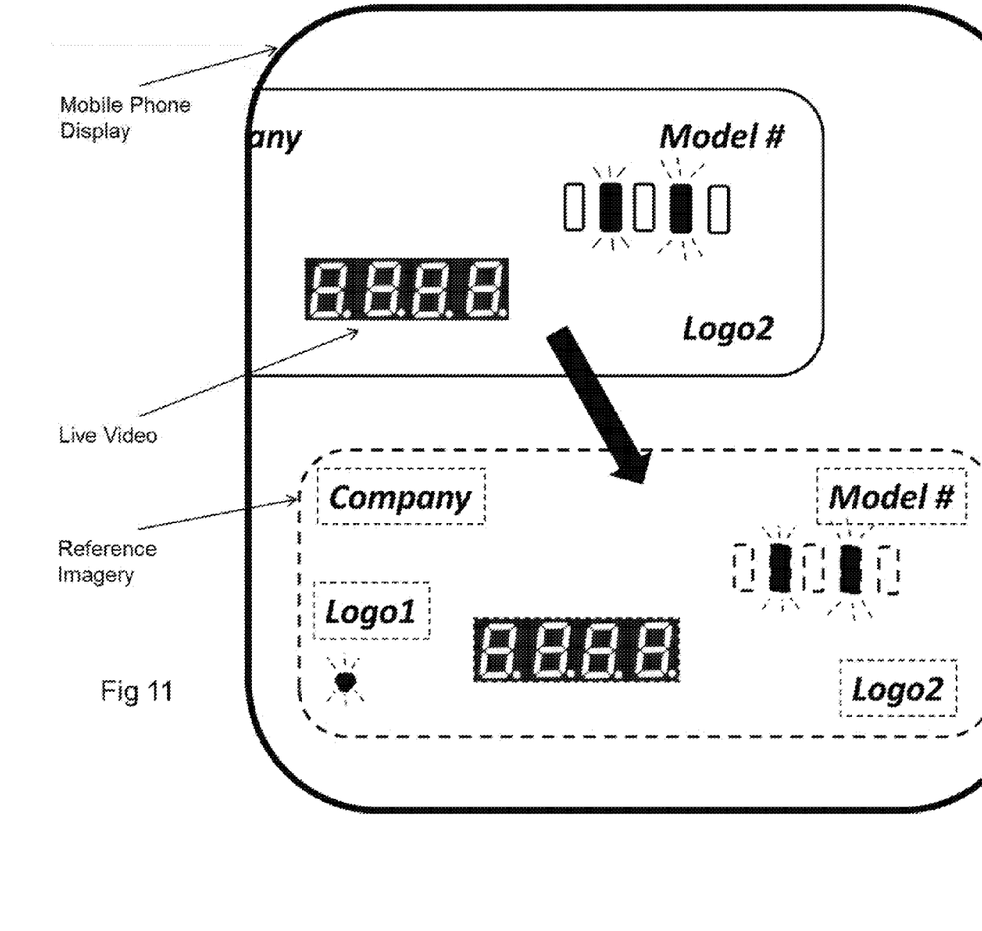
FIG. 11 shows one embodiment of a mobile phone display acquiring imagery of an electronic device.

FIG. 10 shows a block diagram of one embodiment of the diagnostic system. This may be used by the customer on their own mobile phone, using a software application for example. The first step may be to acquire imagery, including video in some embodiments, of the device that has a problem to be diagnosed and resolved. The customer may enter in the model number of the device using a GUI, or may take imagery of a device ID such as a bar-code. The bar-code may be decoded automatically using the same method used in the training process. The device ID may then be sent to the database via the server (see, e.g., FIG. 2) and may be used to index into the reference imagery and associated status and resolution data for the device. In some embodiments, the reference imagery may be presented on the screen of the mobile phone with a 50% translucence for example (see, e.g., FIG. 11), so that live images from the camera of the phone can be observed on the screen by the customer as well as the reference image. The customer may then aim to move the phone to overlay approximately the live imagery acquired from the phone with that of the reference imagery. This serves to perform a coarse alignment step that in some embodiments may facilitate the accuracy and speed of the subsequent automatic alignment step. The coarse alignment step may not be sufficient by itself to perform the alignment necessary for accurate detection of the illuminator status, due at least to the movement of the hand-held mobile phone and the inability of the consumer to precisely overlay the reference imagery to the live imagery to pixel or sub-pixel precision.

Next, an inspection image sequence data may be acquired. Each frame in the acquired image sequence may be aligned to the reference image that was acquired during the training stage. The same alignment process used in the training system may be used in the diagnostic system. The alignment process may allow the pixel coordinates of the polygons drawn by the trainer in the reference imagery defining the reference region areas and the illuminator indicator status areas to be mapped automatically onto the corresponding regions in the imagery acquired by the customer.

A registration quality module may determine whether the reference imagery and the acquired images are all aligned with sufficient precision or not. An example implementation of this quality module is to compute the sum of the squared difference between the reference imagery and each aligned acquired image. If the sum is less than a threshold, then alignment is declared to be accurate and the process can proceed. If the sum is greater than a threshold for any of the acquired images however, then the customer may be asked by prompts on the GUI to re-perform the coarse alignment process and re-perform the acquisition.

Figure 12:
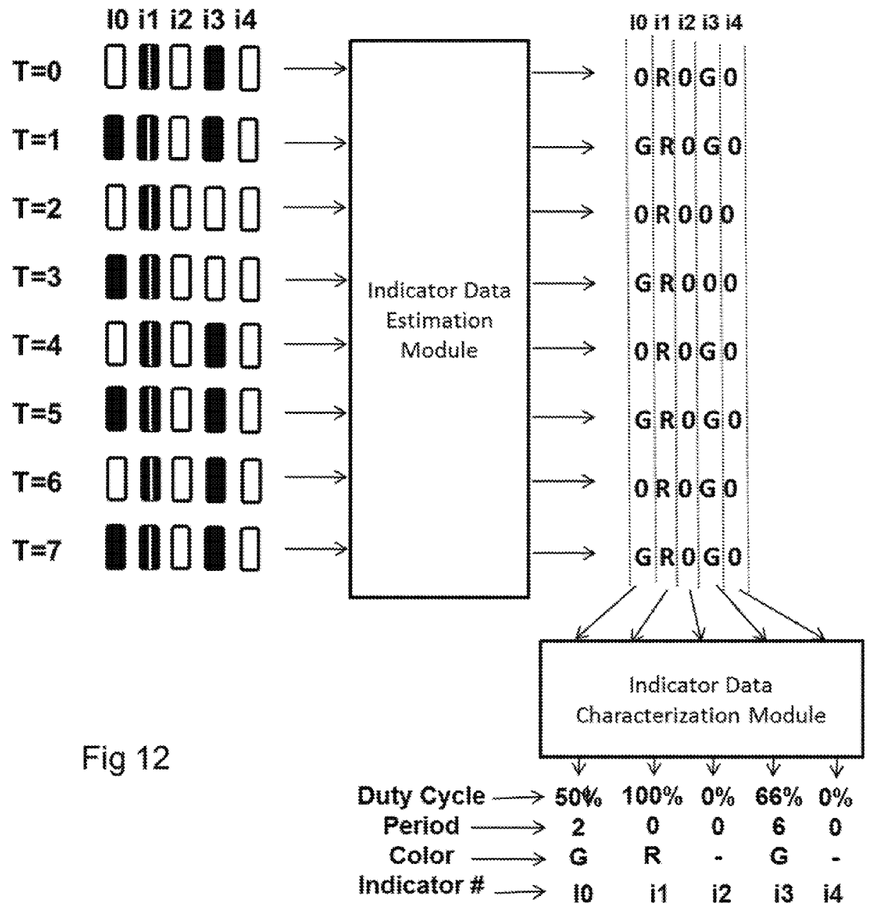
FIG. 12 shows in a diagnostic mode an example temporal sequencing of device status illuminators over time, and on the bottom right shows an example determination of the electronic device status of the electronic device.

The status of the indicator lights on the aligned imagery may then be feature-extracted and characterized using the same processes performed during the training stage, as illustratively shown in FIG. 12. Note that the characterizations of the same mode at the time of training and at the time of diagnosis may not be exact, due to device variation or frame-rate sampling variations for example.

Figure 13:
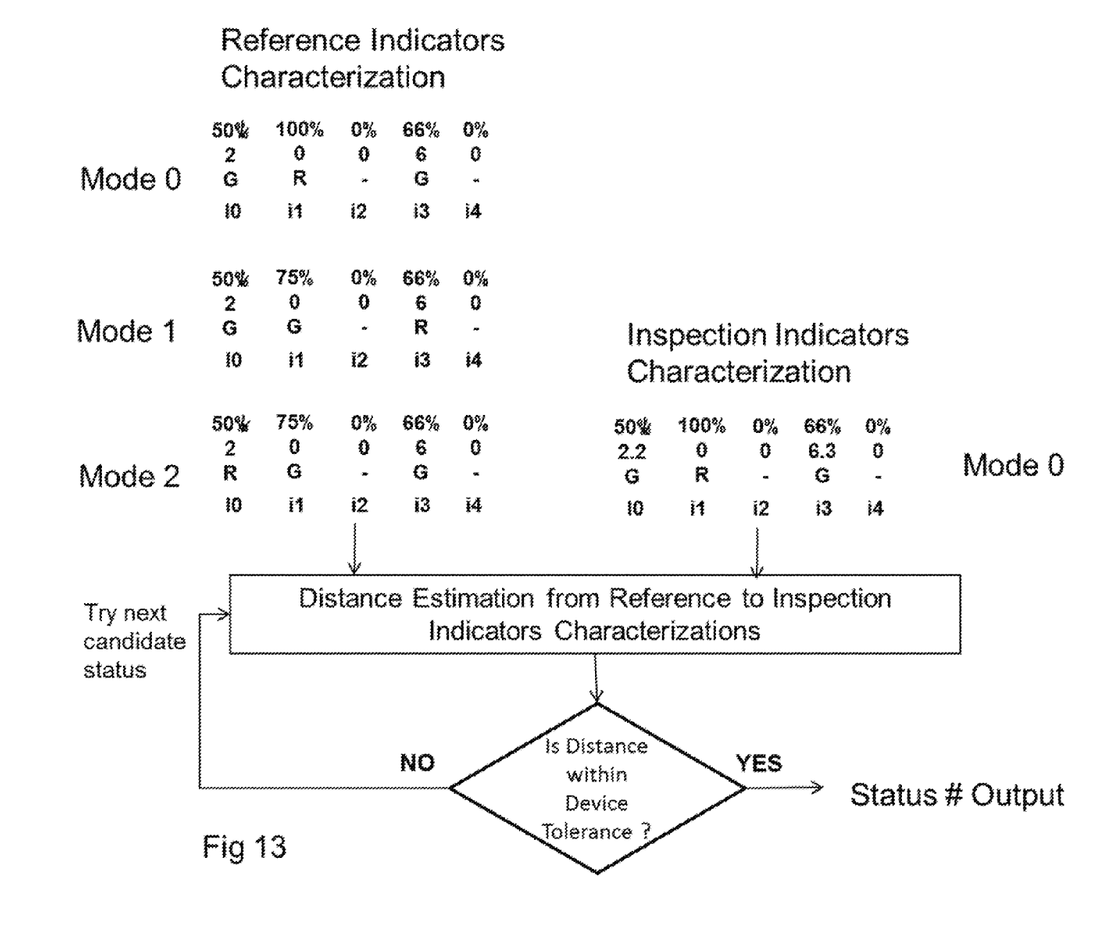
FIG. 13 shows a block diagram of an example determination of the difference vectors between the device status illuminators on an electronic device and the device status illuminators corresponding to imagery of electronic devices in one embodiment of the database, wherein the determination of the difference vectors includes a distance proximity measure, and one embodiment of a decision processor that determines whether the distance proximity measure is within a threshold tolerance.

The characterizations may then be passed into a reference characterization comparison module illustratively shown in FIG. 10, and illustratively shown in more detail in FIG. 13. On the left is the set of failure modes and corresponding illuminator characteristics stored by the trainer and that may be recovered from the database using the device ID index. On the right is the observed set of indicators acquired by the diagnostic system. A distance estimation module may compute a distance or difference vector between each set of reference status characteristics for each failure mode and the observed inspection status characteristics. The distance vector may include one element that gives the difference (1 or 0) between the reference and observed color of the LED. For example, if both LEDs are Red, then the difference may be 0. If one LED is Red and the other is Green, then the difference may be 1. The distance vector computation may also involve the duty cycle and period of the illuminator status lights, as described previously. The trainer's mobile phone may have been acquired at one frame rate, while the consumer's mobile phone may be acquired at another frame rate. Therefore the observed inspection status LED characteristics are normalized such that any temporal-dependent characteristics match the same frame rate used by the trainer's system. For example, in some embodiments, if the training system acquired images at F0=20 Hz and recovered a reference period of 6 frames, then if the diagnostic system acquired images at F1=10 Hz, then the observed period is normalized (multiplied) by F0/F1=2. More generally, the normalization factor is F0/F1.

Even after frame-rate normalization however, variations in device specifications and sampling errors may still result in non-zero differences between the trained characterized status and the observed characterization status. For example, FIG. 13 on the right illustratively shows that the measured reference characteristics the period of LED 3 in device mode 0 is 6.0, while the observed period during diagnosis is 6.3. The difference module may compute the difference in that component of the distance vector and determines whether the absolute difference is within the tolerance specified by the trainer during the training stage. In some embodiments, if the difference is below the threshold then the difference may be defined to be zero, and if the difference is above the threshold then the difference may be defined to be one. This module is illustratively shown at the bottom of FIG. 13.

This comparison may be performed between each reference set of characteristics and the observed inspection set of characteristics. In some embodiments, if the difference between the normalized and thresholded observation status characterization vector is zero, then the observed inspection characteristic may be deemed to be matched to the corresponding reference characteristic which in turn corresponds to a particular device mode.

Other embodiments may use other distance metrics, proximity measures or difference vector computation. For example, a Euclidean distance between some or all of the vector elements may be used in addition to thresholds on individual vector elements. The mode corresponding to the set of status light characteristics in the database with the closest Euclidean distance (the minimum proximity measure, in some embodiments) to the observed set of status light characteristics may then be deemed to be the current device mode. In general, the difference between the observed and each reference set of status characteristics is computed, and a criteria such as the smallest distance may be used to identify which reference set of characteristics corresponds to the observed set of reference characteristics.

In other embodiments, a machine-learning algorithm previously trained on the acquired training imagery can be used to determine a minimum proximity measure between the diagnostic imagery and the training imagery. An example of a machine learning algorithm is described in "ImageNet classification with deep convolutional neural networks", Proceedings of Advances in Neural Information Processing Systems, 2012, by Krizhevsky, Sutskever, Hinton.

Problem Resolution Component

Figure 8:
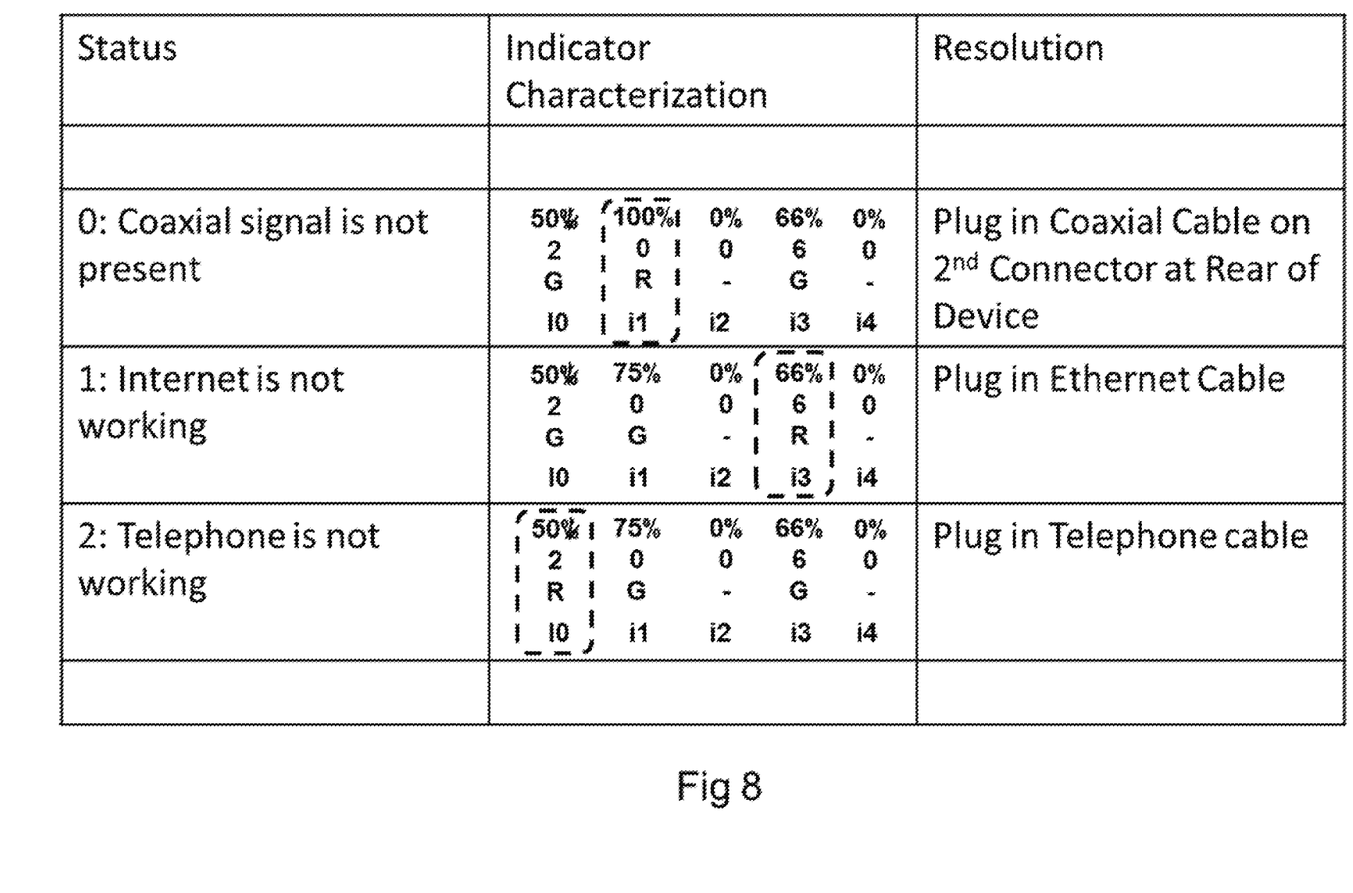
FIG. 8 shows elements in one embodiment of the database corresponding to different electronic device statuses, the corresponding device status illuminator determination, and the corresponding set of resolution instructions required to return the device to a preferred functioning state.
Figure 9:
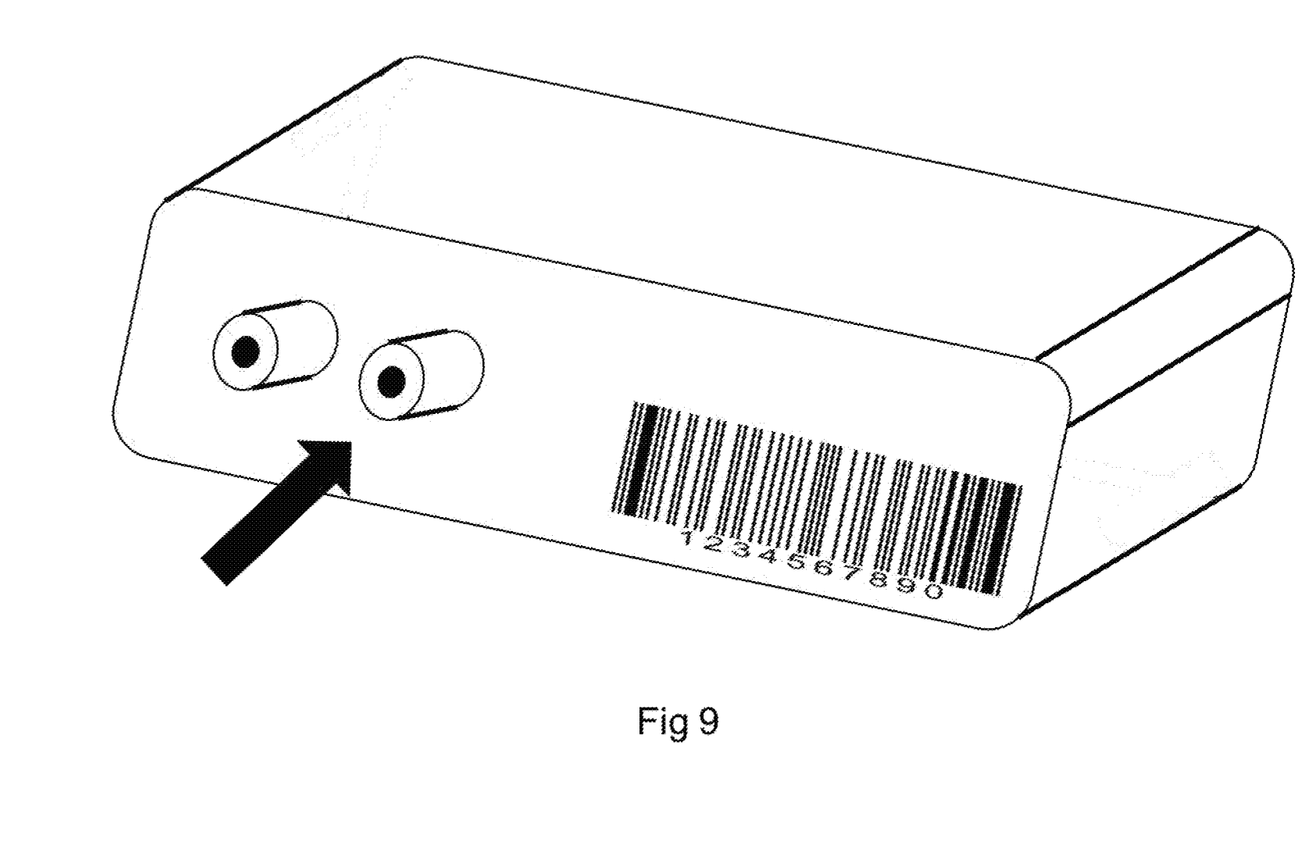
FIG. 9 shows an example embodiment of cable connections on an electronic device, to which cables may be connected or disconnected.

As illustratively shown in FIG. 10, the result of the device mode estimation may then be passed to a decision module that determines from the database whether the mode is a desired mode (e.g. working) or a non-desired mode (e.g. failure), in one or more embodiments. If the status is a non-desired mode, then the mode may be used to index into the database and recover the resolution process stored by the trainer for moving from the current device mode to a different, typically more functional mode. The resolution process may be displayed as imagery, as shown in FIG. 9, or as a textual description as shown in FIG. 8. The process may then be repeated as shown in FIG. 10 to confirm that the resolution process has been successful in moving the device from the current mode to another typically more functional mode.

Recording

In some embodiments, the diagnostic information and the customer's steps are documented in a log file and stored in the server. This log file can be used in several ways. For example, if the customer is unable to resolve the problem, then a customer service representative may review the file either manually or using an automatic tool to provide more advanced support. The automatic tool may be the same as the one described earlier that was used by the customer, except it may include remediation steps that are more complicated to perform.

What is claimed is:

1. A method for diagnosing the status of an electronic device, comprising:
   acquiring, by a camera connected to one or more processors, first imagery of a first electronic device;
   retrieving, from a database, previously-acquired imagery of one or more electronic devices, the one or more electronic devices in known status modes;
   determining, by the one or more processors, a plurality of difference vectors between the first imagery of the first electronic device and the previously-acquired imagery of the one or more electronic device;
   selecting, by the one or more processors, one or more records in the database based on the plurality of difference vectors, the selected one or more records comprising electronic device statuses; and
   displaying, on a screen display, a set of resolution instructions based on the electronic device statuses of the selected one or more records,
   wherein the determining the plurality of difference vectors comprises determining a difference between an electronic display or device status illuminator or cable connection of the first electronic device, and an electronic display or device status illuminator or cable connection corresponding to each of the one or more electronic devices, which comprises:
      registering, using the one or more processors, images acquired over a time period of the first electronic device to a common coordinate system;
      registering, using the one or more processors, the previously-acquired images of the one or more electronic devices to the common coordinate system; and
      determining using the one or more processors, for each of the registered previously-acquired images of the one or more electronic devices, a proximity measure between one of the registered images of the first electronic device and the registered previously-acquired image.

2. The method of claim 1, wherein determining the proximity measure between the one of the registered images of the first electronic device and the registered previously-acquired image comprises determining, using the one or more processors, a distance metric between colors of multiple device status illuminators on the first electronic device, and colors of multiple device status illuminators of an electronic device in the registered previously-acquired image.

3. The method of claim 1, wherein determining the proximity measure comprises determining, using the one or more processors, a distance metric between temporal sequencing of multiple device status illuminators of the first electronic device, and temporal sequencing of multiple device status illuminators of an electronic device in the registered previously-acquired image.

4. The method of claim 1, wherein determining the proximity measure comprises determining, using the one or more processors, a distance metric between temporal sequencing of the device status illuminator of the first electronic device, and temporal sequencing of the device status illuminator of the electronic device in the registered previously-acquired image.

5. The method of claim 1, wherein selecting one or more records in the database comprises determining, using the one or more processors, a minimum difference vector.

6. A system for diagnosing the status of an electronic device, the system comprising:
a camera, one or more processors, a screen display and a database, configured to:
acquire, by the camera connected to the one or more processors, first imagery of a first electronic device;
retrieve, by the one or more processors from the database, previously-acquired imagery of one or more electronic devices, the one or more electronic devices in known status modes;
determine, by the one or more processors, a plurality of difference vectors between the first imagery of the first electronic device and the previously-acquired imagery of the one or more electronic devices;
select, by the one or more processors, one or more records in the database based on the plurality of difference vectors, the selected one or more records comprising electronic device statuses; and
display, on a screen display, a set of resolution instructions based on the electronic device statuses of the selected records,
wherein the one or more processors are configured to determine the plurality of difference vectors by determining a difference between an electronic display or device status illuminator or cable connection of the first electronic device, and an electronic display or device status illuminator or cable connection corresponding to each of the one or more electronic devices, which comprises:
registering images acquired over a time period of the first electronic device to a common coordinate system;
registering the previously-acquired images of the one or more electronic devices to the common coordinate system; and
determining, for each of the registered previously-acquired images of the one or more electronic devices, a proximity measure between one of the registered images of the first electronic device and the registered previously-acquired image.

7. The system of claim 6, wherein the one or more processors are configured to determine the proximity measure between the one of the registered images of the first electronic device and the registered previously-acquired image, by determining a distance metric between colors of multiple device status illuminators on the first electronic device, and colors of multiple device status illuminators of an electronic device in the registered previously-acquired image.

8. The system of claim 6, wherein the one or more processors are configured to determine the proximity measure by determining a distance metric between temporal sequencing of multiple device status illuminators of the first electronic device, and temporal sequencing of multiple device status illuminators of an electronic device in the registered previously-acquired image.

9. The system of claim 6, wherein the one or more processors are configured to determine the proximity measure by determining a distance metric between temporal sequencing of the device status illuminator of the first electronic device, and temporal sequencing of the device status illuminator of the electronic device in the registered previously-acquired image.

10. The system of claim 6, wherein the one or more processors are configured to select the one or more records in the database by determining a minimum difference vector.

* * * * *